Nov. 8, 1960 F. WEBER 2,959,451
IDLER WHEEL POSITION ADJUSTING MEANS
Original Filed May 5, 1959 5 Sheets-Sheet 1
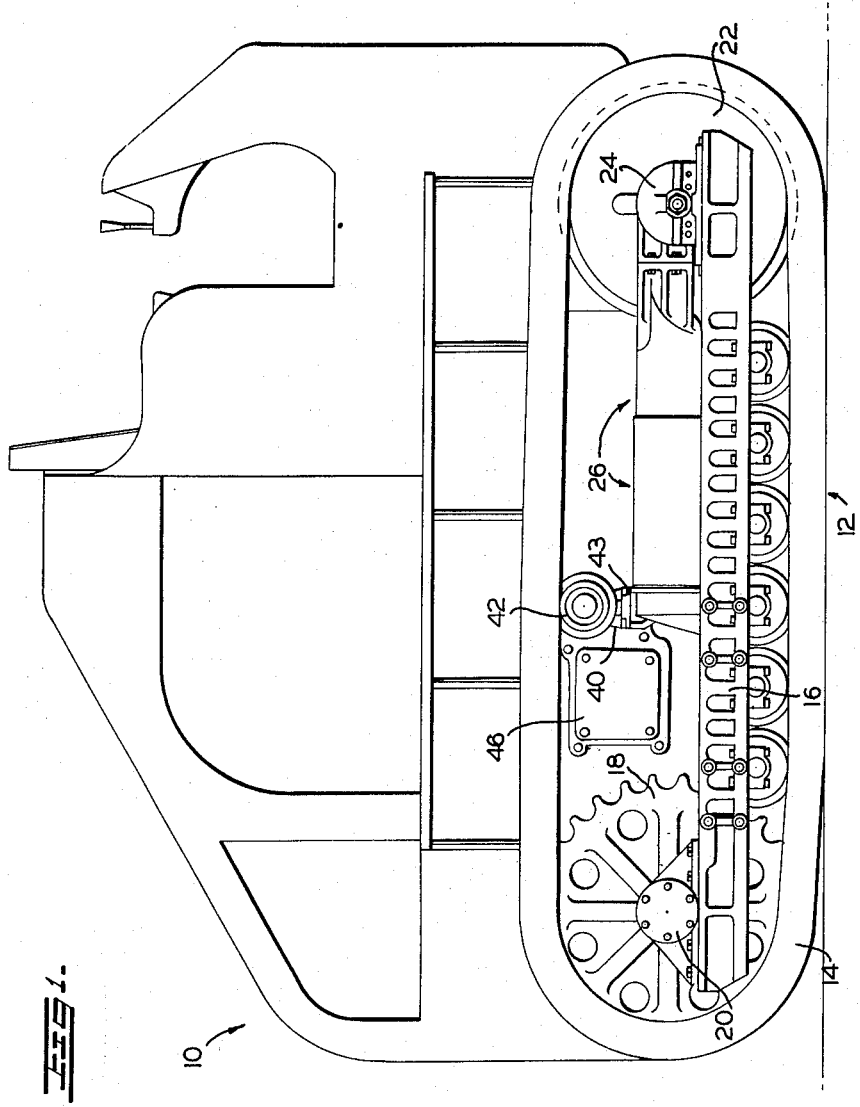
INVENTOR
FRANZ WEBER
BY
ATTORNEYS

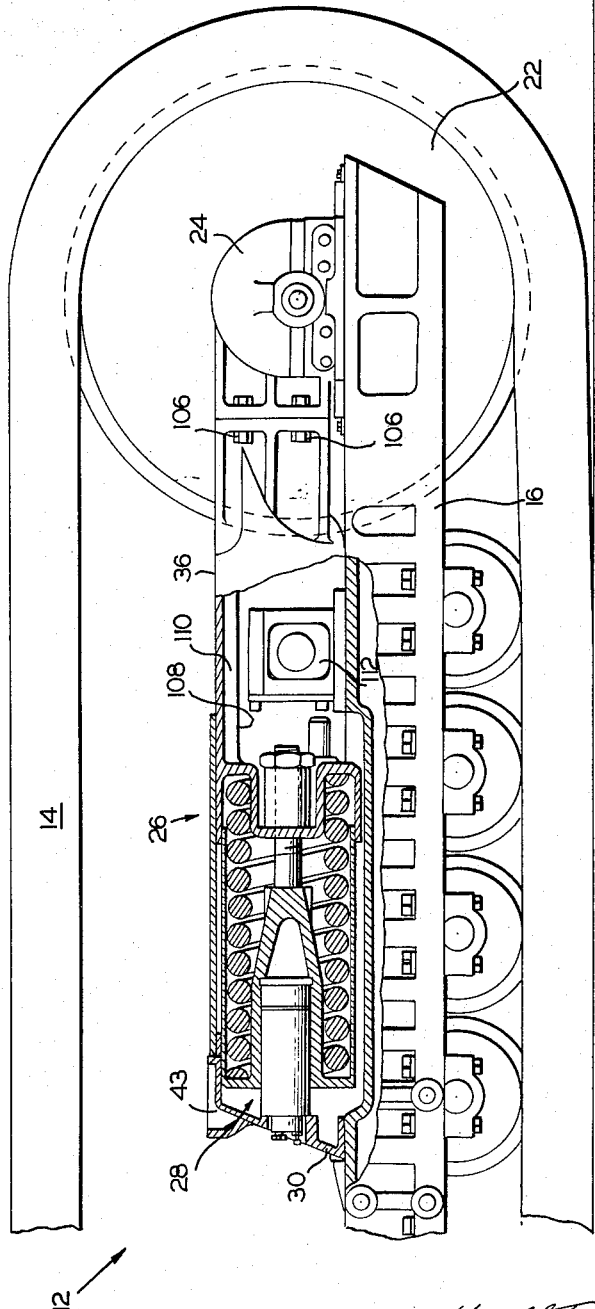

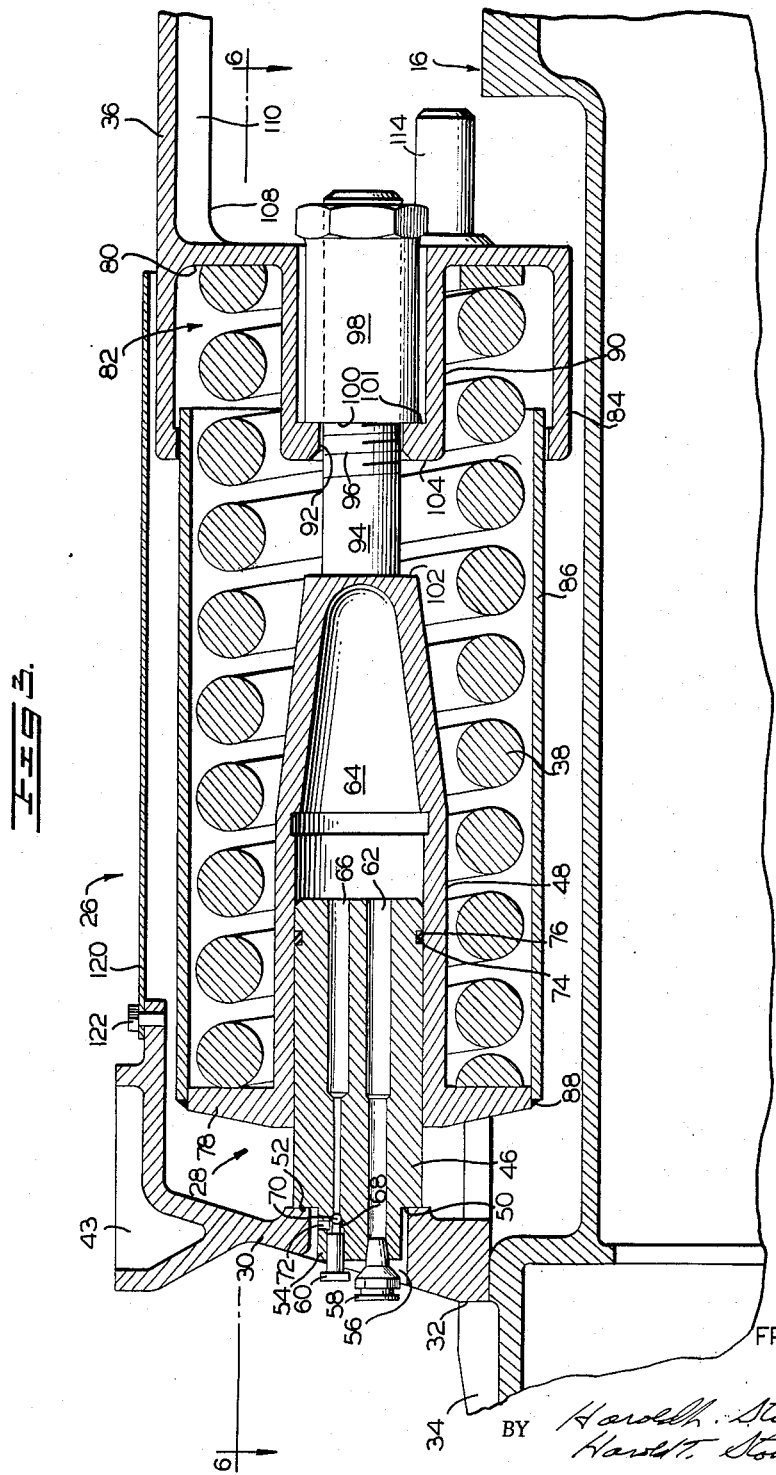

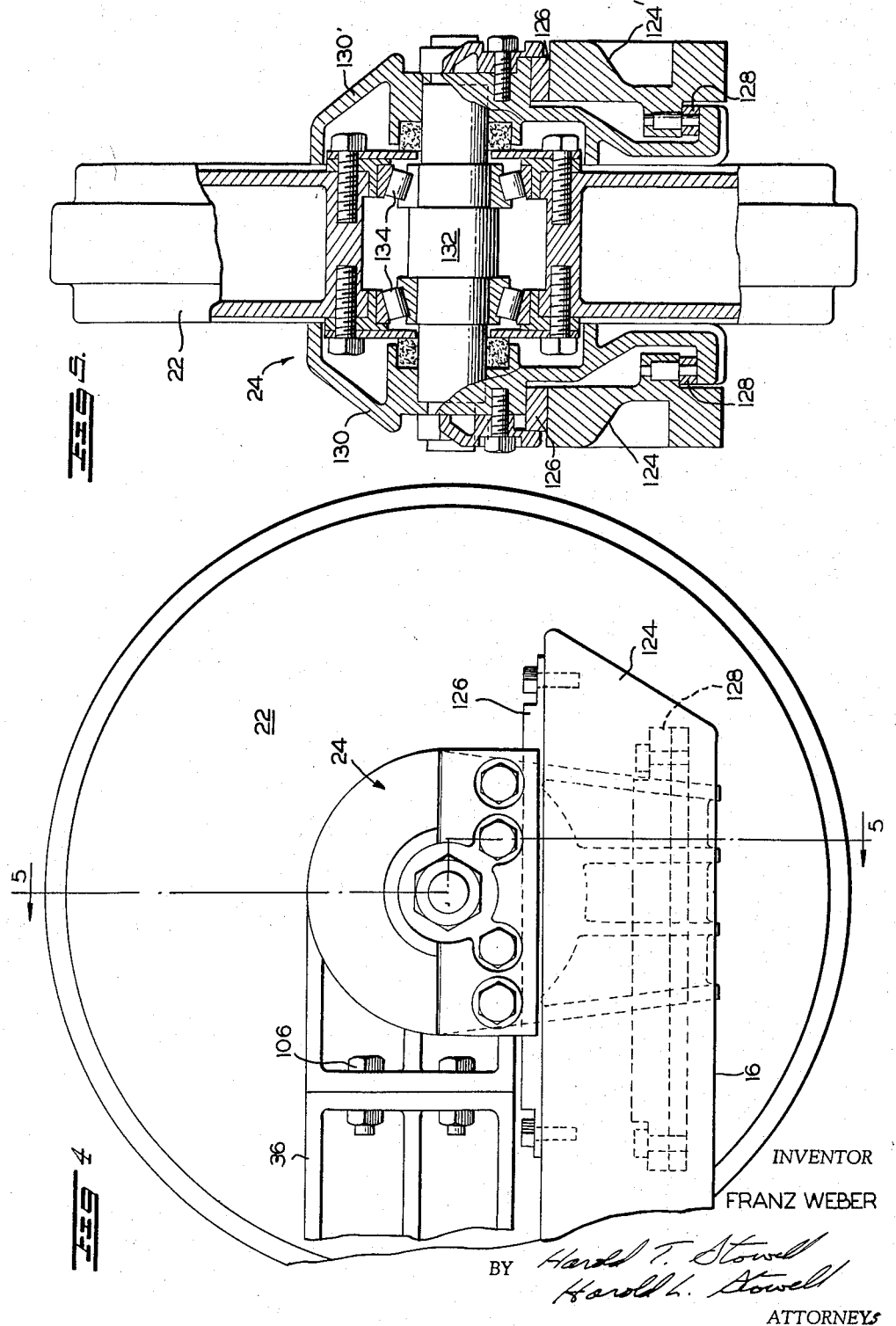

Nov. 8, 1960                F. WEBER                 2,959,451
              IDLER WHEEL POSITION ADJUSTING MEANS
Original Filed May 5, 1959                    5 Sheets-Sheet 5
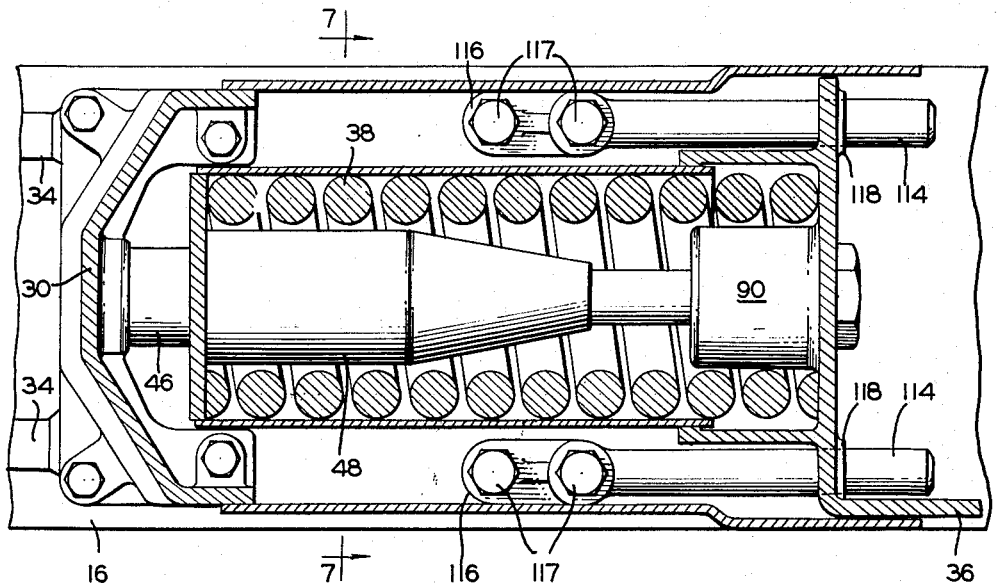
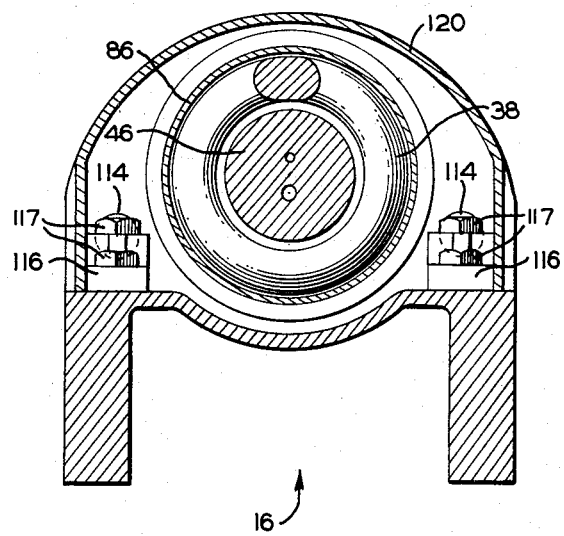
INVENTOR
FRANZ WEBER
BY
ATTORNEYS

United States Patent Office 2,959,451
Patented Nov. 8, 1960

2,959,451

IDLER WHEEL POSITION ADJUSTING MEANS

Franz Weber, Salt Lake City, Utah, assignor to The Eimco Corporation, Salt Lake City, Utah, a corporation of Delaware Continuation of application Ser. No. 811,082, May 5, 1959. This application Apr. 22, 1960, Ser. No. 24,119

11 Claims. (Cl. 305—10)

This invention relates to improvements in idler wheel position adjusting means and more particularly to fluid adjusting means for controlling spring compression in a resilient spring equipped crawler track takeup means for endless track vehicles.

Nut and thread track takeup adjusters of the art have proven to be bulky, cumbersome to adjust, expensive to make and difficult to assemble.

It is, therefore, a major object of the present invention to provide a fluid actuated position adjusting means for endless track takeup springs wherein a resiliently compressed spring is confined between a track idler slidably mounted on a track frame and a pressure fluid piston-cylinder unit.

A further object is to provide a track spring takeup piston-cylinder unit wherein the spring is mounted concentrically around the piston-cylinder unit and abuts a flange at the base of one element of the piston-cylinder unit.

Further objects are to provide a less expensive, readily assembled and disassembled, easily maintained, and more reliable and compact track adjusting means.

These and other objects and advantages are provided in a position adjusting means for a slidably mounted idler wheel including a frame, an idler wheel, support means slidably mounting the idler wheel to the frame and means for adjustably and resiliently positioning said support means comprising a cooperating piston and cylinder unit, means rigidly securing one element of the piston and cylinder unit to the frame, means slidably mounting the other of the elements of the piston and cylinder unit to the support means for the idler wheel, resilient means positioned between the support means for the idler wheel and the other of the elements of the piston and cylinder unit normally urging the support means and the said other of the piston and cylinder elements in spaced rectilinear relationship, and means for directing pressure fluid to the piston and cylinder unit to urge said other of said elements of the piston and cylinder unit toward the support means for the idler wheel against the urging of the resilient means.

The invention will be more fully appreciated from the following detailed description when read in conjunction with the attached drawings wherein:

Fig. 1 is a side elevational view of an endless track equipped vehicle including the improved idler wheel position adjusting means;

Fig. 2 is an enlarged fragmentary and cutaway view of a portion of endless track and track frame illustrated in Fig. 1;

Fig. 3 is an enlarged fragmentary sectional view of a portion of the idler wheel position adjusting means shown in Figs. 1 and 2;

Fig. 4 is an enlarged fragmentary side view of the idler wheel and support means therefor illustrated in Fig. 1;

Fig. 5 is a partial cutaway and sectioned view on line 5—5 of Fig. 4 showing the front idler wheel and idler wheel mounting detail;

Fig. 6 is a fragmentary cutaway and sectioned view substantially on line 6—6 of Fig. 3; and Fig. 7 is a section on line 7—7 of Fig. 6.

Referring to Fig. 1 there is shown one side of a material handling crawler type vehicle 10 provided on each side with an endless track structure 12, each of which includes an endless track 14, a track frame 16, a drive sprocket 18 rotatably mounted to one end of the track frame 16 in bearing supporting bracket means 20 and a track idler wheel 22 which is slidably mounted on the other end of the track frame 16 by guide bracket means 24.

The present invention is particularly directed to the endless track spring takeup or recoil mechanism 26 which includes a fluid actuated adjustment piston and cylinder unit 28. Takeup or recoil mechanism 26 is supported at one end by takeup or recoil bracket 30 which is mounted on the upper surface of each track frame 16 as by bolts with shoulder 32 of raised frame boss 34 taking the end thrust of the track takeup 26 transmitted through bracket 30 instead of through the bracket attaching bolts. The other end of track takeup or recoil mechanism 26 is connected by front idler yoke 36 to guide bracket or support means 24 of idler wheel 22 to thereby urge the idler wheel 22 away from drive sprocket 18 with a resilient spring force as determined by the design of spring 38 and by the desired adjusted setting of the pressure fluid piston-cylinder unit 28. When obstructions wedged between individual track units of an endless crawler track try to pass between the endless track and the drive sprocket or idler wheel or when the crawler track passes over an irregular object the resulting increased tension in the endless track is relieved by recoil action of the idler wheel against the resilient compressive force of the spring.

It is also pointed out that the improved track takeup or recoil mechanism 26 is so compacted with reduced space requirements that a smaller less expensive mount 40, than has been used heretofore, may be used for an upper endless track return flight support roller 42. This roller mount 40 is attached directly to the top portion 43 of recoil bracket 30. In addition, the reduced size of the track takeup or recoil mechanism 26 provides open easy access for removal of a cover plate 46 and service of a vehicle brake and/or other internal structures.

The piston-cylinder unit 28 includes a cylinder 48 which is provided with a stationary piston 46. Piston 46 is provided with a rear shoulder 50 which seats on abutment face 52 of bracket 30 and extension 54 of the piston extends into bracket opening 56 in order that a valved pressure fluid inlet fitting, such as grease fitting 58, and a pressure release fitting 60, each of which are threaded into piston 46, project to the rear of bracket 30 for easy access. Pressure fluid line 62 extends through piston 46 from fitting 58 to cylinder chamber 64 defined by piston 46 and cylinder 48. Pressure fluid release line 66 extends from cylinder chamber 64 to pressure release fitting 60. Fitting 60 seats a ball 68 on seat 70 in line 66 which when loosened permits flow of pressure fluid out opening 72. Groove 74 and O-ring seal 76 limit the loss of pressure fluid from cylinder chamber 64.

Cylinder 48 is provided with an annular flange 78 at its base upon which one end of spring 38 seats whereby spring 38 is in annular surrounding telescoped relation with cylinder 48 throughout substantially the full length of the cylinder. The other end of spring 38 seats on surface 80 in an annular pocket 82 at the rear end of front idler yoke 36. Pocket 82 is formed with an outer annular wall 84 which receives and guides the forward end of tubular spring shield 86 which is welded as at 88 at the other end to cylinder flange 78. Pocket 82 also has a boss 90 with an opening 92 therein through which extends cylinder rod extension 94. Rod extension 94 has threads 96 upon which nut member 98 may be threaded. By screwing the nut 98 toward the cylinder 48, the most inward end 100 of the nut 98 engages surface 101 within boss 90 bringing about relative inward movement between the surface 80 of yoke 36 and flange 78 of cylinder 48 compressing spring 38 up to a limit imposed by abutment of the cylinder shoulder 102 with the face 104 of boss 90. As will be more apparent hereinafter, nut 98 is not an essential element to the proper functioning of the improved takeup mechanism and in assembling a substantial space is left between the shoulder 102 and face 104 of the boss 90. It will be appreciated, however, that by compressing spring 38 in this manner provides for easy assembly or disassembly and maintenance of the assembly. Abutment of boss end 104 with cylinder shoulder 102 also provides a recoil limit relative to cylinder 48 and prevents bottoming of spring coils of spring 38.

Idler yoke 36 which is assembled, as by bolts 106, to guide bracket means 24 at both sides of idler wheel 22 is provided with a cutaway portion 108 on the inner wall 110 thereof. Wall 110 is cutaway in order that equalizer bar and mount structure 112 which interconnects both track frames 16 and the body of vehicle 10 will not interfere with back and forward movement of yoke 36. Two parallel guide rods 114 with mount pads 116, are fixed to track frame 16 as by bolts 117 and extend through openings 118 in yoke 36. The pair of parallel rods 114 thus slidably support and guide the yoke 36 as it reciprocates with reciprocation of the idler wheel 22. A shield 120 which is mounted to bracket 30, as by pins 122, and in like manner (not shown) to frame 16 covers the takeup or recoil mechanism 26 and extends forward over the rear portion of idler yoke 36.

Referring now to Figs. 4 and 5 track frame 16 includes two parallel rails 124 and 124' each of which is provided with bearing guide pads 126 and 128 which guide a bracket half 130 or 130' of guide bracket means 24 for longitudinal movement thereon. Bracket halfs 130 and 130' are joined in assembly by spindle 132 upon which track idler 22 is mounted by bearing means 134.

When it is desired to adjustably increase tension in tracks 14 by stiffening of track recoil springing a fluid, and preferably a relatively noncompressible fluid such as oil or semifluid such as grease, is pumped through fitting 58 and line 62 to cylinder chamber 64. This shifts cylinder 48 away from piston 46, increasing the compression of spring 38 and thereby the tension of track 14. To relieve track tension and/or loosen track recoil springing action through track idler 22, grease may be released from cylinder chamber 64 as desired by backing off grease release fitting 60 to unseat ball 68 from seat 70. The pressure of grease or the like fluid in cylinder chamber 64 is a direct function of the resilient compression of spring 38 for any particular instant as long as boss end 104 of idler yoke 36 does not bottom on cylinder recoil limit shoulder 102.

While there has been shown and described an embodiment of the invention, various changes and modifications may be effected therein without departing from the spirit and scope of the invention as defined in the appended claims. For example, it will be appreciated by those skilled in the art that the piston 46 may be carried as an extension of shaft 94 and the cylinder 48 may be mounted in the opening 56 in the rear plate 30 of the assembly. In such an arrangement, the piston 46 would not be provided with the inlet and outlet fittings 58 and 60 or the bores 62 and 66 as the fittings and bores would be provided in the end of the cylinder 48 and communicate with the chamber 64 within the cylinder.

This application is a continuation of my application Serial No. 811,082, filed May 5, 1959, for "Idler Wheel Position Adjusting Means."

What I claim as new and desire to secure by Letters Patent is:

1. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting one element of the piston and cylinder unit to the frame, resilient means positioned concentrically about at least a portion of the piston and cylinder unit between said support means for the idler wheel and the other of the elements of the piston and cylinder unit normally urging said support means and the said other of the piston and cylinder elements in spaced rectilinear relationship, and means for directing pressure fluid to said piston and cylinder unit to urge said other of said elements of the piston and cylinder unit toward the support means for the idler wheel against the urging of said resilient means.

2. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting one element of the piston and cylinder unit to the frame, resilient means positioned concentrically about at least a portion of the piston between said support means for the idler wheel and the other of the elements of the piston and cylinder unit normally urging said support means and the said other of the piston and cylinder elements in spaced rectilinear relationship, and means for directing pressure fluid to said piston and cylinder unit to urge said other of said elements of the piston and cylinder unit toward the support means for the idler wheel against the urging of said resilient means.

3. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting one element of the piston and cylinder unit to the frame, resilient means positioned concentrically about at least a portion of the cylinder between said support means for the idler wheel and the other of the elements of the piston and cylinder unit normally urging said support means and the said other of the piston and cylinder elements in spaced rectilinear relationship, and means for directing pressure fluid to said piston and cylinder unit to urge said other of said elements of the piston and cylinder unit toward the support means for the idler wheel against the urging of said resilient means.

4. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting one element of the piston and cylinder unit to the frame, means slidably mounting the other of the elements of the piston and cylinder unit to the support means for the idler wheel, resilient means positioned concentrically about at least a portion of the piston and cylinder unit positioned between said support means for the idler wheel and the other of the elements of the piston and cylinder unit normally urging said support means and the said other of the piston and cylinder elements in spaced rectilinear relationship, and means for directing pressure fluid to said piston and cylinder unit to urge said other of said elements of the piston and cylinder unit toward the support means for the idler wheel against the urging of said resilient means.

5. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting the piston of the piston and cylinder unit to the frame, resilient means positioned concentrically about at least a portion of the piston and cylinder unit between said support means for the idler wheel and the cylinder of the piston and cylinder unit normally urging said support means and the cylinder in spaced rectilinear relationship, and means for directing pressure fluid to said piston and cylinder unit to urge said cylinder toward the support means for the idler wheel against the urging of said resilient means.

6. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting the piston of the piston and cylinder unit to the frame, means slidably mounting the cylinder of the piston and cylinder unit to the support means for the idler wheel, resilient means positioned concentrically about at least a portion of the piston and cylinder unit between said support means for the idler wheel and the cylinder of the piston and cylinder unit normally urging said support means and the cylinder in spaced rectilinear relationship, and means for directing pressure fluid to said piston and cylinder unit to urge said cylinder toward the support means for the idler wheel against the urging of said resilient means.

7. The invention defined in claim 6 including stop means for limiting the sliding movement between said cylinder and said support means for the idler wheel.

8. In a position adjusting means for a slidably mounted idler wheel including a frame, an idler wheel, support means slidably mounting the idler wheel to the frame and means for adjusting and resiliently positioning said support means comprising a cooperating piston and cylinder unit, means mounting the piston of the piston and cylinder unit to the frame, means slidably mounting the cylinder of the piston and cylinder unit to the support means for the idler wheel, means for limiting the sliding movement between the said cylinder and the support means for the idler wheel, a helical spring positioned concentrically about at least a portion of the piston and cylinder unit, one end of said spring bearing against said support means for said idler wheel and the other end of said spring bearing against said cylinder and normally urging said cylinder and said support means in spaced rectilinear relationship, and means for directing pressure fluid to said piston and cylinder unit to urge said cylinder toward the support means for the idler wheel and thereby compressing said helical spring.

9. The invention defined in claim 8 wherein said cylinder is concentrically positioned within a portion of said helical spring.

10. The invention defined in claim 8 wherein the means for directing pressure fluid to said piston and cylinder unit includes a valved fitting on one of said elements of the piston and cylinder unit and a fluid pressure line extending into a cylinder chamber defined by the cylinder and said piston.

11. The invention defined in claim 10 including a fluid release line from said cylinder chamber and means normally maintaining the fluid release line in the closed position.

References Cited in the file of this patent

UNITED STATES PATENTS

| | | |
|---|---|---|
| 2,716,577 | Land | Aug. 30, 1955 |
| 2,818,311 | Ashley | Dec. 31, 1957 |
| 2,887,342 | Helsel | May 19, 1959 |